No. 849,654. PATENTED APR. 9, 1907.
J. P. BENNETT.
CORN THINNER.
APPLICATION FILED NOV. 9, 1906.
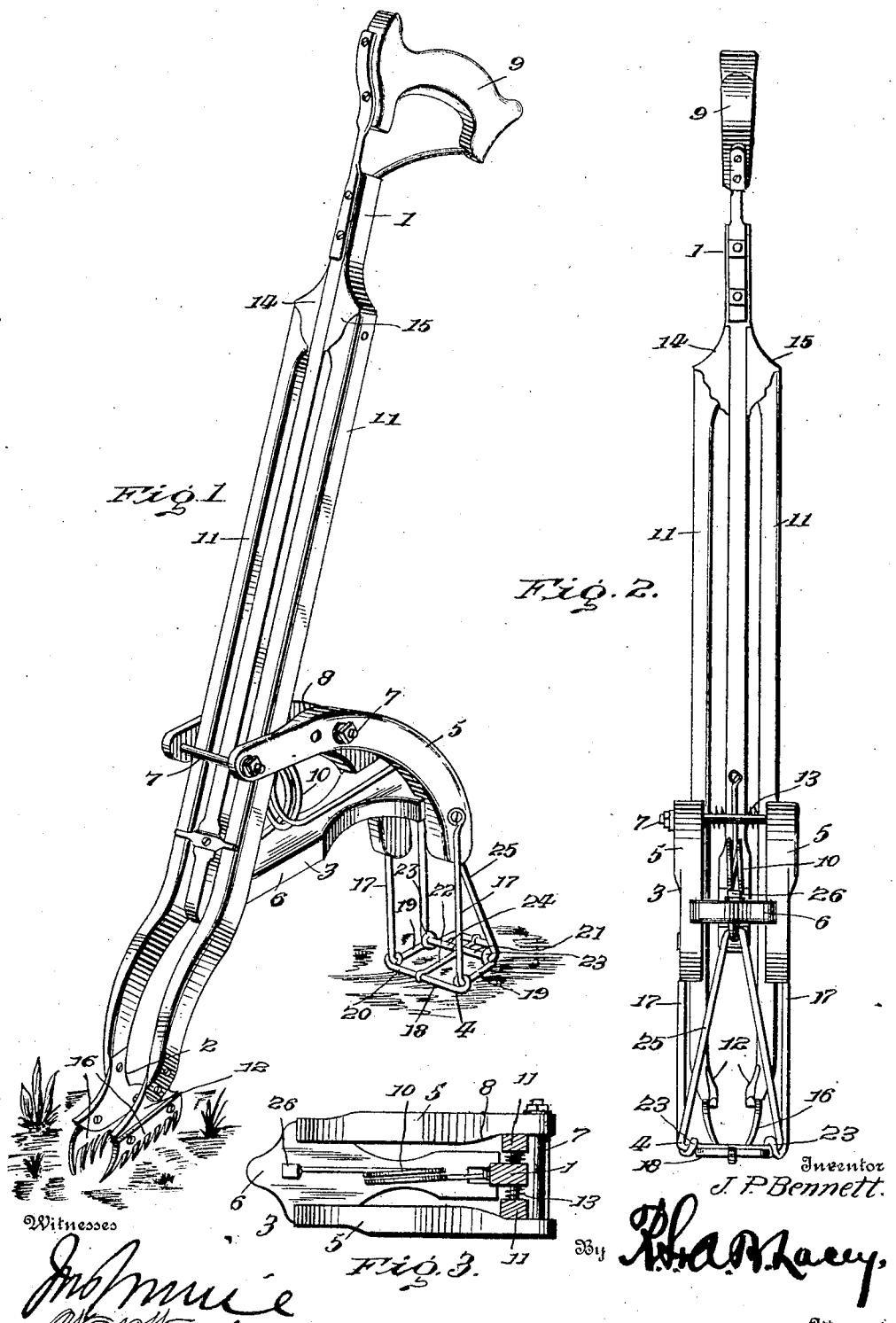

UNITED STATES PATENT OFFICE.

JAMES P. BENNETT, OF BROADWAY, VIRGINIA.

CORN-THINNER.

No. 849,654. Specification of Letters Patent. Patented April 9, 1907.

Application filed November 9, 1906. Serial No. 342,675.

*To all whom it may concern:*

Be it known that I, JAMES P. BENNETT, a citizen of the United States, residing at Broadway, in the county of Rockingham and State of Virginia, have invented certain new and useful Improvements in Corn-Thinners, of which the following is a specification.

This invention provides novel means for use in thinning corn, and thereby obviating the objectionable feature of stooping, as required by the process of thinning the hills by hand.

The invention relates to a hand implement or tool which may be adjusted to the height of the operator, so as to obviate any stooping or bending, and which in operation will take firm hold of the stalks near the root, and thereby insure extirpation of the plants desired to be eradicated, the tool being of such formation as to involve the principle of leverage, the oscillatory movement likewise serving to close the grippers upon the stalk of the plant to be removed.

For a full description of the invention and the merits thereof and also to acquire a knowledge of the details of construction of the means for effecting the result reference is to be had to the following description and accompanying drawings, in which—

Figure 1 is a perspective view of a tool or implement for thinning corn or like plants, the same illustrating the preferred embodiment of the invention. Fig. 2 is a front view of the implement. Fig. 3 is a horizontal section of the tool, taken on a line just above the frame.

Corresponding and like parts are referred to in the following description and indicated in all the views of the drawings by the same reference characters.

The tool comprises a handle-bar 1, grippers 2, frame 3, and a foot-piece 4.

The frame comprises similar side bars 5 and an arm 6, the side bars 5 being curved throughout their length and having a parallel arrangement and the arm 6 having rigid connection near its rear end with the lower portions of the side bars 5 and extending in the same direction as the upper portions of said side bars, but inclining slightly to the horizontal. In order to provide a substantial connection between the side bars 5 and the arm 6, the latter has notched opposite edges to receive the side bars, which latter are bolted or otherwise secured thereto. Tie-rods 7 connect the upper portions of the side bars 5 and constitute stops to limit the oscillatory movements of the handle-bar and grippers. The inner faces of the side bars 5 are inclined at 8 to form, in effect, cam-surfaces, which in the operation of the implement cause the grippers to close upon the stalk or plant preliminary to removal thereof. One of the tie-rods 7 is adjustable, preferably the rear tie-rod, to admit of regulating the oscillatory movement of the handle-bar and grippers, so as to control the degree of the closing of the grippers upon the stalk or plant, thereby obviating crushing of the same.

The handle-bar 1 is pivotally connected at its lower end to the front portion of the arm 6, and its upper end has a grip 9 of a form to enable the hand of the operator to obtain a firm and comfortable grip upon the handle-bar when operating the implement. The grip 9 has adjustable connection with the handle-bar to admit of regulating its distance from the ground, thereby adapting the implement to the height of the operator, so as to obviate stooping or bending. The handle-bar occupies a position centrally of the side bars 5 and is pressed forward by means of a spring 10, which is interposed between said handle-bar and the frame, one arm of the spring being connected to the handle-bar and the other arm attached to the arm 6.

The grippers 2 are of similar formation, each consisting of a bar or member 11 and a jaw 12. The bars or members 11 may be connected to the handle-bar 1 in any manner which will admit of the jaws 12 separating and closing. Under normal conditions—*i. e.*, when the handle-bar occupies a forward position—the jaws of the grippers are separated, and upon moving the upper end of the handle-bar rearward to cause the bars or members 11 to ride upon the inclined or cam surfaces 8 the jaws of the grippers are pressed together, thereby causing them to take hold of the stalk or other plant arranged between them. The lower ends of the bars or members 11 are curved forwardly, so as to throw the jaws 12 in advance of the frame and the handle-bar, whereby they are best adapted to reach into the hill or cluster of plants and take hold of the one to be removed or extirpated. A bar or member 11 is arranged upon each side of the handle-bar, and preferably in the plane thereof, and is adapted to oscillate therewith, whereby in the operation of the implement the jaws 12 are caused to open and close. As shown, the bars or members 11 have pivotal connection at their upper ends with opposite sides of the handle-bar and are pressed upon by means of springs 13, arranged between them and the handle-bar. Spaced projections 14 and 15 extend from opposite sides of the handle-bar and embrace the respective bars or members 11, thereby compelling the parts 11 and handle-bar 1 to oscillate in unison. The projections 14 and 15 are preferably end portions of a rod or bar secured at a central point to the handle-bar. The rear projections 15 are end portions of a rod passed through an opening formed in the handle-bar, whereas the front projections 14 constitute end portions of a bar which is pivoted intermediate of its ends to the handle-bar and which member is adapted to be turned and admits of removing or placing the grippers in position when the front tie-rod 7 is removed. The jaws 12 may form a part of the bars or members 11; but it is preferred to have them separate therefrom and attached thereto to admit of their replacement when required. The inner faces of the jaws are roughened to prevent slipping when gripping and pulling upon the stalks. Where the soil is loamy or moist, the jaws 12 obtain sufficient grip upon the stalks or plants to enable their removal; but when the ground is heavy and dry it is preferred to equip the jaws 12 with claws 16, the points or teeth of which penetrate the stalk or plants and obviate slipping, so that a strong pull may be exerted upon the plants to effect their uprooting. The claws 16 are removably fitted to the jaws, the attachment being effected in any desired manner.

The foot-piece 4 may form an extension of the side bars 5 or may be attached thereto and comprises side bars or members 17 and a rest 18, the latter obtaining a firm purchase upon the ground and forming a fulcrum for the tool or implement to turn upon when tilting the same to effect uprooting of the plant to be removed. The rest 18 comprises side bars 19, transverse bars 20 and 21, and an intermediate longitudinal bar 22. The side bars 19 and rear transverse bar 20 are parts of the same rod forming the side bars or members 17. The transverse bar 20 has its end portions looped about the side bars of the foot-piece at or near juncture of the parts 17 and 19. Eyes 23 are formed in the side bars 19 by opening the latter, and they receive the bent ends 24 of clamp members 25, which are adapted to embrace opposite sides of the foot and hold the implement in position thereon when properly adjusted to the foot. The clamp members 25 operate by a spring action and grip opposite sides of the foot at an intermediate point between the heel and ball or opposite to the hollow of the shoe. The clamp members 25 are connected at their upper ends to the frame 3 and are attached to the arm 6 by the same fastening 26 which connects the spring 10 to said arm. As shown, the clamp members 25 and the bent ends 24, constituting guide members thereof, are parts of a single length of spring-wire doubled upon itself into an approximately V form and have the terminal portions inwardly bent to form the ends or guide members 24, which operate in eyes 23 to properly position the clamp members.

In constructing a tool or implement substantially as herein specified any suitable material may be employed, and the same may consist of metal or wood or a combination thereof.

In operation the foot-piece 4 is fitted to the foot of the operator, the rest 18 coming beneath the foot and the side bars 17 and clamp members 25 embracing the sides of the foot, the clamp members gripping the same so as hold the implement in proper position. The upward convergence of the clamp members 25 results in preventing the upward displacement of the foot when lifting the same from the ground and enabling said lifting of the foot to effect a corresponding elevation of the implement, thereby materially assisting in the manipulation of the movement of the implement from one plant to another and rendering the task of the operator less irksome and fatiguing. When thinning a hill of corn or a group of plants, the implement is adjusted so as to receive the plant to be uprooted between the jaws 12, after which a rearward movement of the upper end of the handle-bar will effect a closing of the jaws upon the plant by the riding of the side bars or members 11 upon the inclines or cam-surfaces 8. A continued movement of the handle-bar after the same has been arrested by coming in contact with the rear tie-rod 7 causes the implement to turn upon the foot-piece as a fulcrum, with the result that the jaws are elevated and effect removal of the plant in the manner well understood. The pressure of the foot upon the rest 18 prevents slipping of the implement during the turning or oscillating thereof to effect uprooting of the plant. After the plant has been removed the rearward pressure upon the handle-bar is removed, and the spring 10 returns the same to a normal position, the grippers being pressed apart by the springs 13, thereby releasing the uprooted plant, which drops to the ground as the implement is lifted and moved to the next plant or hill.

Having thus described the invention, what is claimed as new is—

1. In an implement of the character specified, the combination of a frame provided with a foot and with cam portions and grippers having pivotal connection with the frame and normally standing separated and adapted to be pressed together by riding upon the aforesaid cam portions when imparting an oscillatory movement to the said grippers in the operation of the implement.

2. In an implement of the character set forth, the combination of a frame provided with a foot and with an arm and having cam portions, and transversely-spaced grippers having pivotal connection with said frame to oscillate in the plane thereof and normally standing apart and adapted to be pressed together by riding upon the aforesaid cam portions when imparting an oscillatory movement to the said grippers in the operation of the implement.

3. In an implement of the character specified, the combination of a frame provided with a foot and with cam portions, a handle-bar pivoted to the frame, and grippers connected with said handle-bar to oscillate therewith and having a movement at a right angle to the plane of movement of said handle-bar to permit opening and closing of the grippers, the latter normally standing separated and adapted to be pressed together by riding upon the aforesaid cam portions when imparting an oscillatory movement to the handle-bar and grippers.

4. In an implement of the character described, the combination of a frame, comprising a foot, an arm, and side bars, the latter having cam portions and spaced from said arm, a handle-bar pivoted to the arm and adapted to oscillate, and grippers pivoted to the handle-bar to oscillate therewith and having a lateral movement and normally standing apart and adapted to be pressed together by riding upon the aforesaid cam portions when imparting an oscillatory movement to the handle-bar.

5. In an implement of the character specified, the combination of a frame comprising a foot, an arm, and side bars, the latter having portions overhanging the said arm and provided with cam portions, a handle-bar pivoted to the arm and extended between the spaced portions of the side bars overhanging said arm, and grippers pivoted to the handle-bar to oscillate therewith and adapted to be pressed together by riding upon the aforesaid cam portions when imparting an oscillatory movement to the handle-bar.

6. In an implement of the character described, the combination of a frame having cam portions and handle-bar pivotally connected to the frame, grippers connected to the handle-bar and arranged upon opposite sides thereof and normally spaced apart and adapted to be pressed together upon oscillating the handle-bar by riding upon the aforementioned cam portions and coöperating means between the lower portions of the handle-bar and members of the grippers to retain the parts in proper position.

7. In an implement of the character set forth, the combination of a frame comprising a foot, side bars, and an arm, said side bars having their upper ends overhanging the arm and transversely spaced and provided upon their inner sides with cam portions, a handle-bar pivoted to said arm, grippers pivoted to the handle-bar and adapted to oscillate therewith and normally standing apart, said handle-bar and grippers extended through the space formed between the upper overhanging ends of the aforesaid side bars, and means connecting the upper spaced ends of said side bars and limiting the oscillatory movements of the handle-bar and grippers.

8. In an implement of the character set forth, in combination a frame comprising spaced portions provided upon their inner sides with cam-surfaces, grippers separated by means of the frame and adapted to receive an oscillatory movement to cause them to ride upon the aforementioned cam-surfaces to press the jaws of the grippers together, and tie-rods connecting the spaced portions of the frame and limiting the oscillatory movement of the grippers, one of said tie-rods being adjustable to vary the amplitude of oscillation of the grippers, whereby the degrees of closing of the jaws thereof may be varied.

9. In an implement of the character specified, the combination of a frame, comprising a foot, transversely-spaced side bars and an approximately horizontal arm, the upper ends of the side bars overhanging the said arm and provided upon their inner sides with cam portions, a handle-bar pivoted to said arm, grippers extended along opposite sides of the handle-bar and pivoted at their upper ends thereto and having other lower portions forwardly or outwardly deflected, the handle-bar and grippers extending through the space formed between the upper overhanging portions of the aforesaid side bars, and means connecting the upper portions of said side bars and limiting the oscillatory movements of the handle-bar and grippers.

10. In an implement of the character set forth, in combination of a frame, plant-gripping mechanism carried by said frame and means for securing said frame to the foot of the operator, comprising spring-actuated clamp members.

11. In an implement of the character set forth, in combination of a frame, plant-gripping mechanism carried by said frame and means for securing said frame to the foot of the operator, comprising spring-actuated clamp members, the latter consisting of upwardly-converged elements provided at their lower ends with inwardly-extended guides to maintain said elements in proper position.

12. In an implement of the character specified, the combination of a frame provided with a foot-piece embodying a rest having portions formed into the eyes, plant-gripping mechanism attached to said frame, and spring-actuated clamp members having their lower ends inwardly bent to form guides which are passed through and operate in the aforementioned eyes.

13. An implement of the character specified, comprising complemental grooved side bars spaced apart and having the inner sides of their forward portions inclined to form cams and each connected to the lower rear portions of said side bars and projected forwardly, a handle-bar pivoted to the front end of said arm, grippers arranged upon opposite sides of the handle-bar and connected thereto and having their lower portions forwardly deflected, tie-rods connecting the side bars and limiting the oscillation of the handle-bar and grippers, a foot-piece projected from the side bars and having eyes at its lower end and spring-actuated clamp members for guides arranged to operate in the aforementioned eyes.

In testimony whereof I affix my signature in presence of two witnesses.

JAMES P. BENNETT. [L. S.]

Witnesses:
OSCAR R. TURNER,
JOS. M. MASON.